Sept. 1, 1925.
A. J. MOTTLAU
1,552,336
BEAD INSULATED HEATING ELEMENT
Filed Dec. 19, 1922
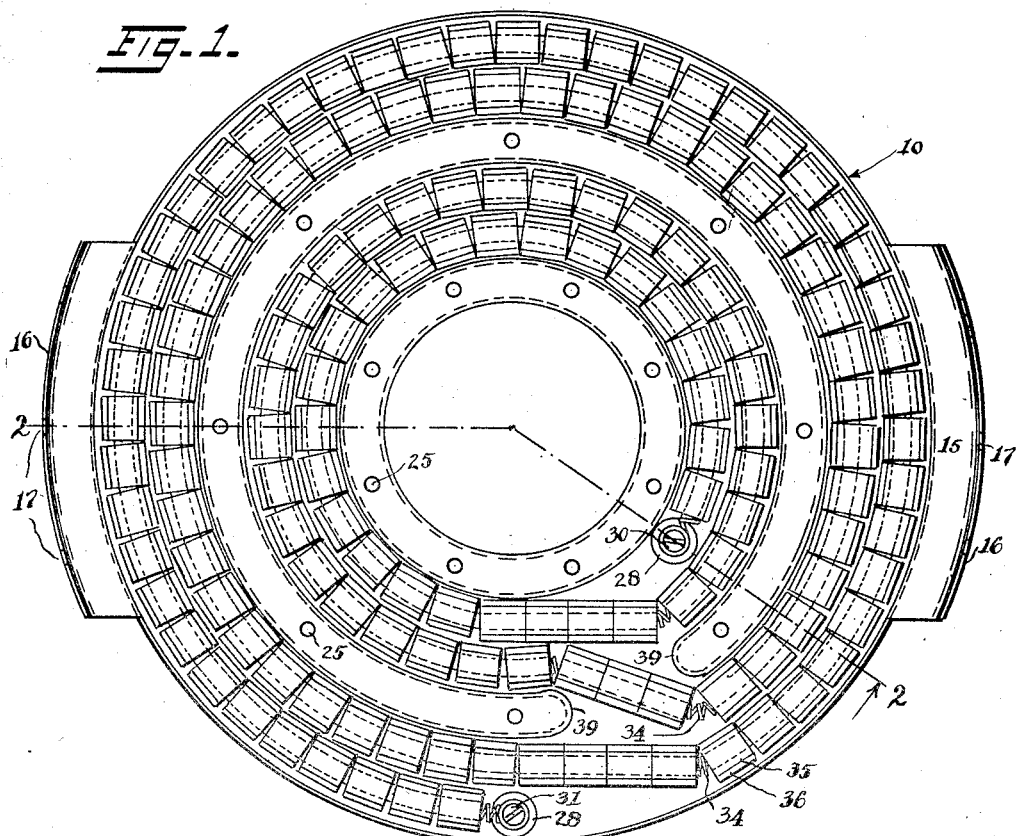
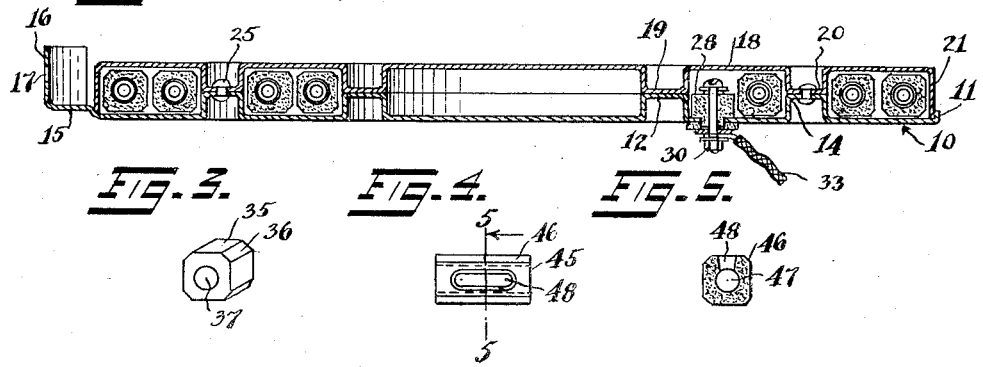
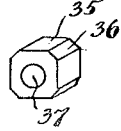
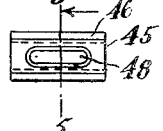
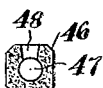
Witnesses:
Inventor:
August J. Mottlau,
By his Atty, Patented Sept. 1, 1925.

1,552,336

UNITED STATES PATENT OFFICE.

AUGUST J. MOTTLAU, OF JENKINTOWN, PENNSYLVANIA, ASSIGNOR TO A. MECKY COMPANY, OF PHILADELPHIA, PENNSYLVANIA, A CORPORATION OF PENNSYLVANIA.

BEAD-INSULATED HEATING ELEMENT.

Application filed December 19, 1922. Serial No. 607,807.

*To all whom it may concern:*

Be it known that I, AUGUST J. MOTTLAU, a subject of the King of Denmark, residing in Jenkintown, in the county of Montgomery and State of Pennsylvania, have invented certain new and useful Improvements in Bead-Insulated Heating Elements, of which the following is a specification.

This invention relates to electric heating units for waffle irons, and also to elements and insulators therefor, though it is noted that the invention is not limited to waffle irons, nor in some respects even to heating devices.

One object of the invention is to provide an improved element or device of this kind in which the heating wire cannot sag or the element get displaced during use.

Another object of the invention is to provide an apparatus or device of this kind in which the heating element can be encased in economically manufactured stamped metal casing plates.

Another object of the invention is to provide an apparatus or device of this kind in which the heating element cannot come into contact with the casing on any part that might cause a short circuit.

Other objects of the invention are to improve generally the simplicity and efficiency of such devices and to provide a device or apparatus of this kind which is durable, economical to manufacture, assemble and operate and which will not get out of order.

The inventive features for the accomplishment of these and other objects are shown in connection with an improved heating element which, briefly stated, comprises a supporting plate provided with an annular rib near the middle portion and an intermediate arcuate rib, on which plate is received a retaining plate having positioning ribs registering with the annular and arcuate ribs, and between which plates there is disposed a spiral heating element comprising a fine helical heating wire and insulating beads provided with perforations received on said wire. Two forms of the bead are shown.

Other objects of the invention will appear as the description proceeds; and while herein details of the invention are described, the invention is not limited to these, since many and various changes may be made without departing from the scope of the invention as claimed.

In the accompanying drawings, showing by way of example, two of many possible embodiments of the invention, Fig. 1 is a plan of the heating unit with the retaining plate removed;

Fig. 2 is a sectional view, partly in elevation of the heating unit taken on the line 2—2 of Fig. 1, looking in the direction of the arrow of said line, the retaining plate being in place;

Fig. 3 is a perspective view of one form of bead;

Fig. 4 is a plan of the other form of bead; and

Fig. 5 is a transverse sectional view, partly in elevation of the bead, taken on the line 5—5 of Fig. 4 looking in the direction of the arrow of said line.

My improved heating unit comprises a substantially circular supporting plate 10 provided with a narrow peripheral retaining flange 11 (Fig. 2) extending toward the medial plane of the unit, an impressed annular positioning rib 12 near the middle portion of the plate, an intermediate arcuate nearly annular positioning rib 14 all co-axial with the disk, said ribs meeting said plane. Diametrically opposite peripheral portions of said retaining flange 11 are outwardly extended, as at 15, and then transversely turned across said plane to form a supporting bracket 16 provided with openings 17 by which the supporting plate may be secured to the housing portion of an electrical heating appliance.

Upon or by the supporting plate is carried a retaining plate having impressed annular and arcuate positioning ribs 19 and 20 registering with and resting against the annular and arcuate ribs 12 and 14 of the supporting plate. The retaining plate has also a peripheral nesting flange 21 turned across said plane and nesting in said retaining flange 11. Rivets 25 or other suitable means passing through the contacting portions of said ribs secure the plates together.

Insulating bushings 28 and washers 29 disposed respectively in and surrounding passage openings in said supporting plate carry inner and outer binding screws or bolts 30 and 31 passing through said bushings and washers, and carrying conductors 33 secured to the outer ends of said binding screws for connecting to a suitable source of current.

The electric heating means of this unit comprises a spiral heating element comprising a fine helical heating wire 34 secured at opposite ends to the inner end of said screws 30 and 31, and carrying a plurality of prismatic approximately cubical closely adjacent insulating beads 35 provided with beveled side edges 36 (Fig. 3) and an axial perforation 37 received on said wire. Said heating element extends from said outer binding screw 31 against and nearly around said nesting flange 21, thence around the outer face of the arcuate rib 14, thence between the ends 39 of the arcuate rib to and around the inner face of the arcuate rib 14, and then approximately around said annular rib 12 to the inner screw 30.

Where radiant heat radiating directly from the wire 34 is desired, an insulating device such as shown in Figs. 4 and 5 may be used. This insulating device comprises an elongated prismatic bead 45 of porcelain, lava or the like, provided with beveled side edges 46, and an axial perforation 47 for receiving the wire, as in Fig. 3. In addition the bead 45 has an elongated heat radiating opening 48 extending from the top or bottom face of the bead to the perforation, though the invention is not limited to one radiating opening.

I claim:

1. In combination, a supporting plate provided with an annular rib near the middle portion, and an intermediate arcuate rib, a retaining plate having positioning ribs registering with the annular and arcuate ribs, and a peripheral flange; and a heating element between said plates extending from said peripheral flange, thence around the arcuate rib, thence to and around the inner face of the arcuate rib, and then approximately around said annular rib.

2. A heating unit, comprising, in combination, a substantially circular supporting plate provided with a narrow peripheral retaining flange extending toward the medial plane of the unit, an inpressed annular positioning rib near the middle portion of the plate, an intermediate arcuate nearly annular positioning rib both coaxial with the disk and meeting said plane; a circular retaining plate having inpressed annular and arcuate positioning ribs registering with and resting against the annular and arcuate ribs of the supporting plate, a peripheral nesting flange turned across said plane and nesting in said retaining flange; inner and outer binding screws near said annular and nesting ribs respectively; and an insulated heating element extending from said outer binding screw against and nearly around said nesting flange, thence around the outer face of the arcuate rib, thence between the ends of the arcuate rib to and around the inner face of the arcuate rib, and then approximately around said annular rib to the inner screw.

3. A supporting plate having radially extended supporting brackets; a retaining plate secured to the supporting plate; and a heating element between said plates.

4. In combination, a supporting plate provided with an annular rib near the middle portion; an intermediate arcuate rib, and a peripheral releasing flange; a retaining plate having positioning ribs registering with the annular and arcuate ribs and a peripheral flange nesting in the retaining flange; insulated diametrically opposite peripheral portions of said retaining flange being outwardly extended and then transversely turned across to form a supporting bracket provided with openings by which the supporting plate may be secured to the housing portion of a cooking or heating utensil; and heating element between said plates extending from said nesting flange, thence around the arcuate rib, thence to and around the inner face of the arcuate rib, and then approximately around said annular rib.

5. In combination, a pair of plates each provided with an annular rib near the middle portion, an intermediate arcuate rib; a retaining plate having positioning ribs registering with the annular and arcuate ribs and a peripheral flange; outer and inner passages being provided near said annular rib and peripheral flange; rivets passing through adjacent portions of said ribs for securing the plates together; insulating bushings and washers respectively in and surrounding said passage openings; inner and outer binding screws passing through said bushings and washers; conductors secured to the outer ends of said binding screws; and an insulated heating element, said element extending from said outer binding screw against and nearly around a peripheral flange, thence around the outer face of the arcuate ribs, thence between the ends of the arcuate rib to and around the inner face of the arcuate rib, and then approximately around said annular rib to the inner screw.

6. A heating unit comprising a pair of spaced plates; and a heating element extending in spaced rows between said plates and comprising a heating conductor and a plurality of insulating beads received on said conductor and engaging between and against said plates.

7. A heating unit comprising a pair of spaced plates; and a heating element extending spirally between said plates and comprising a heating conductor and a plurality of beads received on said conductor.

8. In combination, a pair of spaced plates one of which is provided with ribs; and a heating element comprising beads disposed between said plates and positioned by said ribs.

9. In combination, a supporting plate provided with a plurality of ribs; a retaining plate spaced from said supporting plate; portions of a heating element disposed side by side between said plates and ribs; and beads on said portions spacing them from each other and the ribs.

10. A heating unit comprising a pair of spaced plates; and a heating element extending between said plates and comprising a heating conductor and a plurality of beads received on said conductor and having flat faces engaging flat against both of said plates.

11. An insulating device comprising a prismatic bead provided with an axial perforation for receiving a heating wire; and a heat radiating opening extending from a face of the bead to the perforation and terminating short of one end of the bead.

12. An insulating device comprising a prismatic bead provided with an axial perforation for receiving a heating wire; and a heat radiating opening extending from a face of the bead to the perforation and terminating short of both ends of the bead.

13. A heating unit comprising a pair of highly heat-conductive spaced plates; and a heating element extending between said plates and comprising a heating conductor and a plurality of insulating beads received on said conductor.

14. A heating unit comprising a pair of spaced metal plates; and a heating element extending between said plates and comprising a heating conductor and a plurality of insulating beads received on said conductor.

15. A heating unit comprising a pair of spaced plates one of which has metal ribs thereon; and a heating element extending between said plates and comprising a heating conductor and a plurality of insulating beads received on said conductor and engaging said ribs.

16. A heating unit comprising a pair of spaced plates; and a heating element spirally disposed between said plates and comprising a heating conductor and a plurality of insulating beads received on said conductor and engaging the beads of an adjacent convolution of said element.

17. A heating unit comprising a pair of spaced plates; and a heating element portions extending side-by-side between said plates and comprising a heating conductor and a plurality of insulating beads received on said conductor and engaging the beads of the portion at the side thereof.

18. A heating unit comprising a pair of spaced plates; and a heating element extending between said plates and comprising a heating conductor and a plurality of insulating beads received on said conductor and having extended flat surfaces in flat heat conducting contact with said plates.

19. A heating element comprising a heating conductor and a plurality of insulating beads held against movement in any lateral direction on said conductor and provided with lateral heat radiating openings.

AUGUST J. MOTTLAU.